United States Patent
Eigruber

[11] Patent Number: 5,628,560
[45] Date of Patent: May 13, 1997

[54] DOUBLE-SCREW EXTRUDER

[75] Inventor: Horst Eigruber, McPherson, Kans.

[73] Assignee: American Maplan Corporation, McPherson, Kans.

[21] Appl. No.: 659,038

[22] Filed: Jun. 3, 1996

Related U.S. Application Data

[63] Continuation-in-part of Ser. No. 628,501, Apr. 5, 1996, and a continuation of Ser. No. 449,571, May 24, 1995, abandoned.

[51] Int. Cl.⁶ .................................................. B29B 7/48
[52] U.S. Cl. ............................................. 366/83; 366/89
[58] Field of Search .......................... 366/79, 83–85, 366/88, 89, 96, 97, 323; 425/204, 208, 209

[56] References Cited

U.S. PATENT DOCUMENTS

| | | |
|---|---|---|
| 3,239,883 | 3/1966 | Ferrari . |
| 3,605,188 | 9/1971 | McCormick et al. . |
| 3,782,700 | 1/1974 | Wittrock . |
| 3,850,415 | 11/1974 | Hansen . |
| 4,047,705 | 9/1977 | Hanslik . |
| 4,132,845 | 1/1979 | Covington, Jr. et al. . |
| 4,247,206 | 1/1981 | Zahradnik ........................ 366/83 |
| 4,408,888 | 10/1983 | Hanslik ........................... 366/83 |
| 4,409,165 | 10/1983 | Kim . |
| 4,415,336 | 11/1983 | Stasi et al. . |
| 4,462,692 | 7/1984 | Meyer . |
| 4,525,073 | 6/1985 | Spinner ....................... 366/89 X |
| 4,708,623 | 11/1987 | Aoki et al. . |
| 4,773,763 | 9/1988 | Weber . |
| 5,215,374 | 6/1993 | Meyer . |
| 5,232,280 | 8/1993 | Moriyama . |

FOREIGN PATENT DOCUMENTS 356882  10/1979  Austria .

*Primary Examiner*—Charles E. Cooley
*Attorney, Agent, or Firm*—Herbert Dubno

[57] ABSTRACT

A screw for a double-screw extruder has its flight defining an outer cone and an inner cone of different convergencies with the inner cone converging more steeply than the outer cone from the feed end to the exit end of the extruder. Where A is the outer diameter at the feed end, B is the outer diameter at the exit end, C is the flight height at the feed end and D is the flight height at the exit end, the screw is defined by the relationship $m \times (A-B)/B = (C-D)/D$ where m is less than zero and greater than $-0.75$, the screw having a length $L \geq 15B$.

11 Claims, 1 Drawing Sheet

DOUBLE-SCREW EXTRUDER

CROSS REFERENCE TO RELATED APPLICATIONS

This application is a continuation-in-part of Ser. No. 08/628,501 filed 5 Apr. 1996 and, in turn, a continuation of then Ser. No. 08/449,571 of 24 May 1995, now abandoned.

FIELD OF THE INVENTION

My present invention relates to a double-screw extruder for plastifying thermoplastic compositions and to a screw construction for such an extruder. More particularly, the invention relates to a double-conical screw design where the exterior of the flight or thread lies along one conical surface and the root of the flight lies along a conical surface with a different conicity.

BACKGROUND OF THE INVENTION

In Austrian Patent 356,882, and the corresponding U.S. Pat. No. 4,247,206, there is described a screw for a double-screw extruder in which the screw is of the type having a double-conical screw design where the outside diameter decreases toward the exit side at a steeper pitch than the core of the screw.

In that patent, the screw is defined by the formula $m \times (A-B)/B = (C-D)/D$. In this formula, A represents the outside diameter of the screw at the barrel entrance, B represents the outside diameter of the screw at the barrel exit, C is the screw flight depth at the barrel entrance and D is the screw flight depth at the barrel exit. In this patent moreover, m is a number between 0.5 and 0.75 and represents the difference in the degree of convergencies of the outer diameter of the screw where the outer periphery of the flight lies along a conical surface of greater apex angle and the root of the screw whose root surface lies along a conical surface of a lesser apex angle.

In practice, m can range between 0.01 and 0.5 in another commercial design and there has been suggestion in the art that m should range between 0.75 and 1.0. All of these systems are double-conical screws where the cone of the root and the cone of the outer periphery have different convergencies or apex angles, but always with the convergency of the outer periphery greater than the convergency of the root cone.

Where m=0, the two cones have the same apex angles or tapers.

The prior art double-cone designs described above were developed to increase the material which could be admitted to the screws in the feed section of the barrel and thereby increase the throughput of the screws. As a consequence, however, there is a continuous compression of the thermoplastic composition or polymer as it passes from the inlet to the outlet. This can cause excessive pressure and shear, especially at the exit region and, as a result, melt control is lacking, there can be degradation of the polymer, there may be excessive backflow, and there may be discharge at any barrel vent which may be provided.

While these problems are largely overcome with parallel extruder designs because of the lack of continuous increase in the compression forces, it is difficult to build reliable parallel high-pressure counter-rotating extruder gearboxes below about 80 mm diameter. The upstream shafts are not sufficiently separated to provide for proper bearings for them. Conical designs, therefore are preferred for lower capacity extruders since the spacings of the shafts at the upstream end will be greater and consequently a more robust gearbox can be designed.

OBJECTS OF THE INVENTION

It is, therefore, the principal object of the present invention to provide an improved double-screw extruder which is free from the above-mentioned drawbacks.

Another object of this invention is to provide a double-screw extruder which suffers less from degradation of polymer backflow and lack of melt control, especially at the exit portion of the apparatus.

It is also an object of the invention to provide an improved screw construction for that extruder.

SUMMARY OF THE INVENTION

These objects are attained, in accordance with the invention, in a double-screw extruder in which the core diameter decreases along the length of the screw at a greater rate than the outer diameter, i.e. in a double-cone screw construction the root cone has a greater apex angle than the cone of the periphery. This results in a decrease in the natural compression and allows a conical-screw extruder to function in more respects like a parallel-screw extruder while nevertheless affording the desired large spacing of the screw shafts at the upstream ends of the screws.

The specific double-conical design of the invention can be defined by a value of m which is less than zero and preferably can range as low as −0.75.

More particularly, a double-screw extruder for plastifying thermoplastic polymers can comprise:

an extruder barrel having pair of laterally connected conical screw chambers converging from a barrel entrance side toward a barrel exit side; and a pair of counter-rotating interfitting screws in the barrel, each of the screws being received in a respective one of the screw chambers, each of the screws having a conical body formed with a helical screw flight extending from an inlet end at the barrel entrance side to an outlet end at the barrel exit side for advancing a thermoplastic composition therealong, the flight having an outer periphery lying along a first conical surface and a root surface defining a core of the body and lying along a second conical surface with a greater apex angle than the first surface, the screw having an outside diameter A at the inlet end, an outside diameter B at the outlet end, a screw flight depth C at the inlet end, and a screw flight depth D at the outlet end, wherein $m \times (A-B)/B = (C-D)/D$ and $0 > m > -0.75$.

The invention also comprises a screw for use in a double-screw extruder which comprises a conical body formed with a helical screw flight extending from an inlet end to an outlet end for advancing a thermoplastic composition therealong, the flight having an outer periphery lying along a first conical surface and a root surface defining a core of the body and lying along a second conical surface with a greater apex angle than the first surface, the screw having an outside diameter A at the inlet end, an outside diameter B at the outlet end, a screw flight depth C at the inlet end, and a screw flight depth D at the outlet end, wherein $m \times (A-B)/B = (C-D)/D$ and $0 > m > -0.75$.

Preferably m is less than −0.01, and even more advantageously is less than −0.1. The value of m may be greater than −0.70.

The screw has a minimum length L which is 15 times the outside diameter B at the outlet end. Shorter lengths yield a nonhomogeneous composition with insufficient fusion of the thermoplastic and which is incapable of yielding the desired product. The maximum length of the screw is 24 times the outside diameter B at the outlet end. Thus $15B \leq L \leq 24B$. The helical screw flight extends over the entire length L of the conical body and each of the conical screw chambers is also of the length L such that the conical body extends over a full length of the respective chamber with a helical flight extending over that length.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
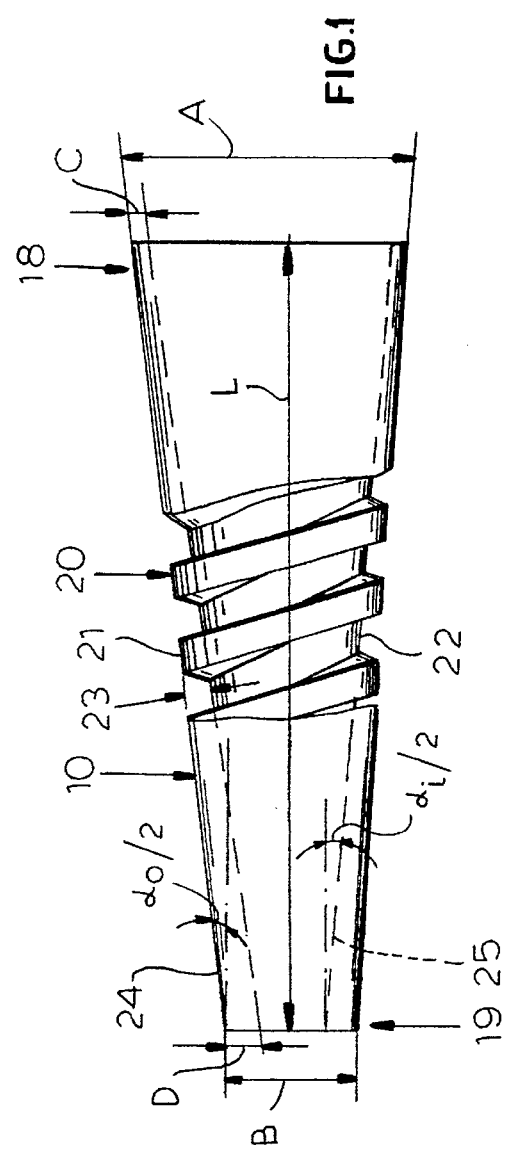
FIG. 1 is a diagrammatic elevational view of a screw for use in a double-screw extruder illustrating the principles of the invention.
Figure 2:
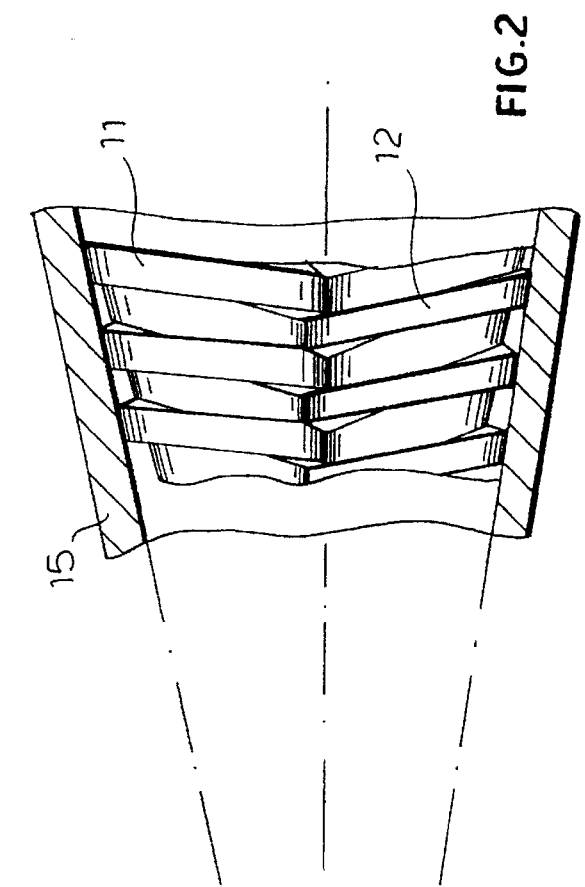
FIG. 2 is a longitudinal section through the double-screw extruder utilizing that screw.
Figure 3:
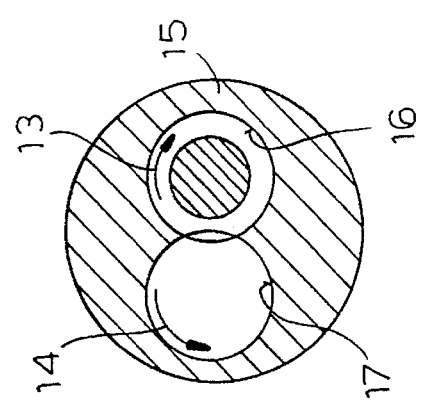
FIG. 3 is a transverse section through a double-screw extruder with only one screw in place.

In FIG. 1, I have shown a screw 10 in highly diagrammatic form, this screw being one of two screws 11 and 12 which are driven in opposite senses as represented by the arrows 13 and 14 in an extruder barrel 15 having two conical compartments 16 and 17 receiving these screws. The inlet end is represented generally at 18 in FIG. 1 and the outlet end is represented at 19. The shafts of the screws have not been shown nor has the gearing driving these screws at the inlet end. The screws each have helical flights 20 with outer peripheries 21, roots 22 and flight heights represented at 23 in FIG. 1.

In the embodiments shown and in the preferred embodiment of the invention, the flight is of constant pitch over the length of the screw from the inlet side 18 to the outlet side 19 thereof.

However, unlike the screw of U.S. Pat. No. 4,247,206, the screw of the invention is defined by two conical surfaces represented at 24 and 25, respectively. The conical surface 24 is that of the outer periphery of the flight and has an apex angle $\alpha_o$, where the half angle $\alpha_o/2$ has been shown in FIG. 1. The conical surface 25 has an apex angle $\alpha_i$ whose half angle $\alpha_i/2$ has been depicted in FIG. 1. In accordance with the invention, $\alpha_o$ is less than $\alpha_i$, i.e. the convergence of the cone 25 of the root 22 of the flight is greater than the convergence of the cone of the outer surface 21 thereof.

In FIG. 1, moreover, A represents the outside diameter of the screw at the barrel entrance, B represents the outside diameter of the screw at the barrel exit, C represents the screw flight depth 23 at the barrel entrance and D represents the screw flight depth 23 at the barrel exit. In the formula $m \times (A-B)/B = (C-D)/D$, m, according to the invention, is less than zero, i.e. is a negative value which can range up to $-0.75$. The result is less compression toward the exit end and reduced danger of degradation of the polymer.

As noted previously $15B \leq L \leq 24B$ and preferably $16B \leq L \leq 23B$. Excellent results are obtained with $L \geq 18B$.

I claim:

1. A screw for a screw extruder for plastifying thermoplastic compositions, comprising a conical body formed with a helical screw flight extending from an inlet end to an outlet end for advancing a thermoplastic composition therealong, said flight having an outer periphery lying along a first conical surface and defining an apex angle, said flight having a root surface defining a core of said body, said root surface lying along a second conical surface with a greater apex angle than said apex angle of said first conical surface, said screw having an outside diameter A at said inlet end, an outside diameter B at said outlet end, a screw flight depth C at said inlet end, and a screw flight depth D at said outlet end, wherein $m \times (A-B)/B = (C-D)/D$ and $0 > m > -0.75$, said conical body having a length L from said inlet end to said outlet end of at least 15B.

2. The screw defined in claim 1 wherein $-0.01 > m > -0.75$.

3. The screw defined in claim 2 wherein $-0.1 > m > -0.70$.

4. The screw defined in claim 3 wherein $15B \leq L \leq 24B$.

5. The screw defined in claim 4 wherein $16B \leq L \leq 23B$.

6. A screw extruder for plastifying thermoplastic compositions, comprising:

an extruder barrel having a pair of laterally connected conical screw chambers converging from a barrel entrance side toward a barrel exit side; and a pair of counter-rotating interfitting screws in said barrel, each of said screws being received in a respective one of said screw chambers, each of said screws having a conical body formed with a helical screw flight extending from an inlet end at said barrel entrance side to an outlet end at said barrel exit side for advancing a thermoplastic composition therealong, each of said flights having an outer periphery lying along a first conical surface defining an apex angle, each of said flights having a root surface defining a core of the respective body, each of said root surfaces lying along a respective second conical surface with a greater apex angle than the apex angle of the respective first surface, each of said screws having an outside diameter A at said inlet end, an outside diameter B at said outlet end, a screw flight depth C at said inlet end, and a screw flight depth D at said outlet end, wherein $m \times (A-B)/B = (C-D)/D$ and $0 > m > 0.75$, each of said screws having a length $L \geq 15B$.

7. The screw extruder defined in claim 6 wherein $-0.01 > m > -0.75$.

8. The screw extruder defined in claim 7 wherein $-0.1 > m > -0.70$.

9. The screw extruder defined in claim 8 wherein $15B \leq L \leq 24B$.

10. The screw extruder defined in claim 9 wherein $16B \leq L \leq 23B$.

11. The screw extruder defined in claim 10 wherein $L > 18B$.

* * * * *